(12) United States Patent
Persaud

(10) Patent No.: US 6,192,351 B1
(45) Date of Patent: Feb. 20, 2001

(54) FUZZY NEURAL NETWORKS

(75) Inventor: Krishna Chandra Persaud, Chorlton (GB)

(73) Assignee: Osmetech PLC (GB)

( * ) Notice: Under 35 U.S.C. 154(b), the term of this patent shall be extended for 0 days.

(21) Appl. No.: 08/913,472

(22) PCT Filed: Feb. 23, 1996

(86) PCT No.: PCT/GB96/00406

§ 371 Date: Jan. 27, 1998

§ 102(e) Date: Jan. 27, 1998

(87) PCT Pub. No.: WO96/26492

PCT Pub. Date: Aug. 29, 1996

(30) Foreign Application Priority Data

Feb. 24, 1995 (GB) .................................................. 9503760

(51) Int. Cl.⁷ .................................................. G06F 15/18
(52) U.S. Cl. .................................. 706/2; 706/31; 706/20; 706/16; 382/156; 382/157; 382/159
(58) Field of Search ................................. 706/31, 20, 16, 706/2; 382/156, 157, 159

(56) References Cited

U.S. PATENT DOCUMENTS 5,619,620 * 4/1997 Eccles ..................................... 706/31

FOREIGN PATENT DOCUMENTS 0527567  2/1993  (EP) ............................... G05B/13/02

OTHER PUBLICATIONS

Vlachos et al, "Fuzzy Neural Networks for Gas Sensing", The 8th Inter. Conf. on Solid-State Sensors and Actuators, IEEE, Jun. 1995.*

Tan et al, "A Network with Multi-Partitioning Units" IEEE IJCNN, Jun. 1989.*
Hayashi et al, "Fuzzy Neural Expert System with Automated Extraction of Fuzzy If—Then Rules From a Trained Neural Network" IEEE Proceedings of 1st Inter. Symposium on Uncertainty Modeling and Analysis, Dec. 1990.*
Nauck et al, "NEFClass—A Neuro Fuzzy Approach for the Classification of Data", Proceedings of the 1995 ACM Symposium of Applied Computing, Feb. 1995.*
K. Bhutani et al. "Fuzzy Approach to a Neural Network", Proceedings of the International Joint Conference on Neural Network, Singapore, Nov. 18–21, 1991, vol. 2 of 3, Nov. 18, 1991, pp. 1675–1680.
M. Rubin, "Fuzzy Artmap Automatic Target Recognition from Single and Multiple Wavelength Radar Range Profiles", International Conference on Neural Networks/World Congress on Computational Intelligence, Orlando, Florida, Jun. 27–29, 1994, vol. 3, Jun. 27, 1994, pp. 1613–1618.
D.Munchen, "Neuro Fuzzy", ATP Automatisierungstechnische Praxis, vol. 36, No. 5, May 1994, pp. 10–12; 14–18; and 20–24.
B. Kosko, "Unsupervised Learning in Noise", *IEE Transactions on neural Networks*, vol. 1, No. 1, Mar. 1990, pp. 44–57.

* cited by examiner

*Primary Examiner*—Tariq H. Hafiz
*Assistant Examiner*—George Davis
(74) *Attorney, Agent, or Firm*—Christie, Parker & Hale, LLP

(57) ABSTRACT

There is disclosed a pattern identifying neural network comprising at least an input and an output layer, the output layer having a plurality of principal nodes, each principal node trained to recognize a different class of patterns, and at least one fuzzy node trained to recognize all classes of patterns recognized by the principal nodes but with outputs set out at levels lower than the corresponding outputs of the principal nodes.

18 Claims, 2 Drawing Sheets

FUZZY NEURAL NETWORKS

This application is A371 of PCT/GB96/00406 filed Feb. 23, 1996, publication No. WO 96/26492.

BACKGROUND OF THE INVENTION

This invention relates to neural networks, particularly with regard to pattern recognition.

Multilayer artificial neural networks are commonly used for supervised training problems where input patterns are required to be placed into user defined classes. Such networks consist of sets of processing elements known as neurons or nodes that are arranged into two or more layers. One layer is always an input layer, comprising neurons whose outputs are defined by the input pattern presented, and another layer is always an output layer. Usually there is at least one "hidden" layer of neurons sandwiched between the input and output layers, and the network is a "feedforward" one where information flows in one direction only. Normally inputs to neurons in each layer originate exclusively from the outputs of neurons in the previous layer.

The output of a given neuron in the network is a function of the inputs into the neuron. More specifically, a neuron has n inputs, labelled 0 to n-1, together with an assumed input, called the bias, which is always equal to 1.0. The neuron is characterised by n+1 weights which multiply the inputs and an activation function that is applied to the sum of the weighted inputs in order to produce the output of the neuron. The sum of weighted inputs including the bias is known as the net input, thus the output O of the neuron from a set of n inputs $x_i (i=0, \ldots, n-1)$ can be derived from equation 1:

$$O = f(\text{net}) = f\left(\sum_{i=0}^{n-1} x_i w_i + w_n\right) \quad (1)$$

where net is the net input, f is the activation function and $w_n$ is the bias weighting.

The operational characteristics of the neuron are primarily controlled by the weights. The activation function is typically a non-linear function, often some sort of threshold function, that, when applied to the net input of a neuron, determines the output of that neuron. Sigmoid functions are often employed.

Typically the number of output neurons provided is equal to the number of classes of input patterns to be differentiated. Usually, during training in "supervised" mode a set of defined input training patterns for each class is presented to the input layer of the neural network, and an output neuron is set to be "ON" for that class while the other outputs are forced to be "OFF". The initial weights of the network are set to be random, and the mean squared error for a single presentation of input data is found by squaring the difference between the attained activation and the target activation for each neuron and averaging across all neurons. For each iteration or epoch, an error is calculated by averaging the errors of the training presentations within that epoch. The mean square error in the output activations is calculated and this propagated back into the network so that the mean square error is reduced for each class by iteratively adjusting the weight multipliers for each neuron in the network. Since the partial derivatives $$\left(\frac{\delta \, \text{Error}}{\delta w_{ij}}\right)_{w_{kl}}$$

are known it is a relatively straightforward exercise to determine which directions the weights should move in order to minimise the error. Such a procedure is known as error backpropagation. Differential competitive learning algorithms used in unsupervised learning neural networks are described in B Kosko, "Unsupervised learning in noise", IEEE Transactions on Neural Networks Vol. 1 (1990) 44.

The ability to place an input pattern into user defined classes is a frequently exploited attribute of neural networks. One particular application is in processing signals from a multi-element array of gas sensors that display broad and overlapping sensitivity to different classes of chemicals, and in using the relative responses between sensor elements (the input pattern in this context) as a means of differentiating different classes of odour. In the development of a suitable neural network architecture for gas sensing applications, a number of problems have been encountered. One problem is the need to classify odours into global classes, e.g. floral, fishy, fruity, musky, etc, and then to subdivide each of these global classes into local classes, e.g., jasmine, rose, etc as a local class of the floral global class. Another problem relates to the accuracy of classification into classes. Once a network has been trained, the system can recognise incoming patterns and switch different outputs depending on how closely an incoming pattern resembles a pattern with which the network has been trained. However, a question arises regarding the response of the system if an incoming pattern shows at best only a faint resemblance to the pattern classes it has been trained to recognise. Generally, the system will fire the output node or neuron to which there is best match; however, such a response may not be an optimal one. It may be better in some cases for the system to register that an unknown pattern class has been presented to the network.

The present invention addresses the aforementioned problems which, it is noted, apply generally to pattern recognition, and not just to odour classification per se.

SUMMARY OF THE INVENTION

According to the invention there is provided a pattern identifying neural network comprising at least an input and an output layer, the output layer having a plurality of principal nodes, each principal node trained to recognise a different class of pattern, and at least one fuzzy node trained to recognise all classes of pattern recognised by the principal nodes, but with thresholds set at levels higher than the corresponding threshold levels in the principal nodes. The neural network may further comprise at least one hidden layer of nodes, and may employ a feedforward architecture. The number of nodes in the hidden layer or layers may be equal to the number of nodes in the input layer plus a biasing node. Other architectures, such as a Parzen network, or a radial basis function network, may also be employed.

The error backpropagation algorithm may be used to train the network.

The neural network may employ a fuzzy pattern classification system, and this system may involve (in the event that the output from the fuzzy node is the largest nodal output in the output layer but this output does not exceed the output of at least one principal node by a predefined value) the principal node having the output closest to the output of the fuzzy node being selected as representing the most likely class of pattern. Further, a probability distribution representing the likelihood of an input pattern falling into any of the classes pattern represented by each of the principal nodes may be calculated.

The output layer may comprise two slabs, each slab comprising a plurality of principal nodes and at least one fuzzy node, the principal nodes of one slab being trained to recognise global classes of patterns and the principal nodes of the second slab trained to recognise sub-classes of patterns within each global class.

The input pattern input to the input layer of the network may comprise the outputs of a plurality of gas sensors or quantities related thereto. When the output layer comprises two slabs, the principal nodes of the second slab may be trained to recognise patterns representing different concentrations of at least one gas or volatile species. In this manner the neural network may output the concentration of a species in addition to the identity thereof.

The output of a temperature sensor may be input to the input layer.

The output of a humidity sensor may be input to the input layer.

In this manner, variations in patterns caused by temperature and humdity sensitive variations in gas sensor output may be recognised and accounted for by the neural network.

The input pattern may be reduced by a linear or non-linear mapping technique and the results therefrom, together with the unreduced pattern, input to the input layer. The mapping technique may be principal components analysis.

The input pattern to the network may be preprocessed prior to pattern identification.

The preprocessing may comprise removal of elements of the input pattern which do not contribute substantially to the final identification.

Alternatively, the preprocessing may comprise decimation of the input database.

BRIEF DESCRIPTION OF THE DRAWINGS

Embodiments of neural networks according to the invention will now be described with reference to the accompanying drawings, in which.

DETAILED DESCRIPTION

Figure 1:
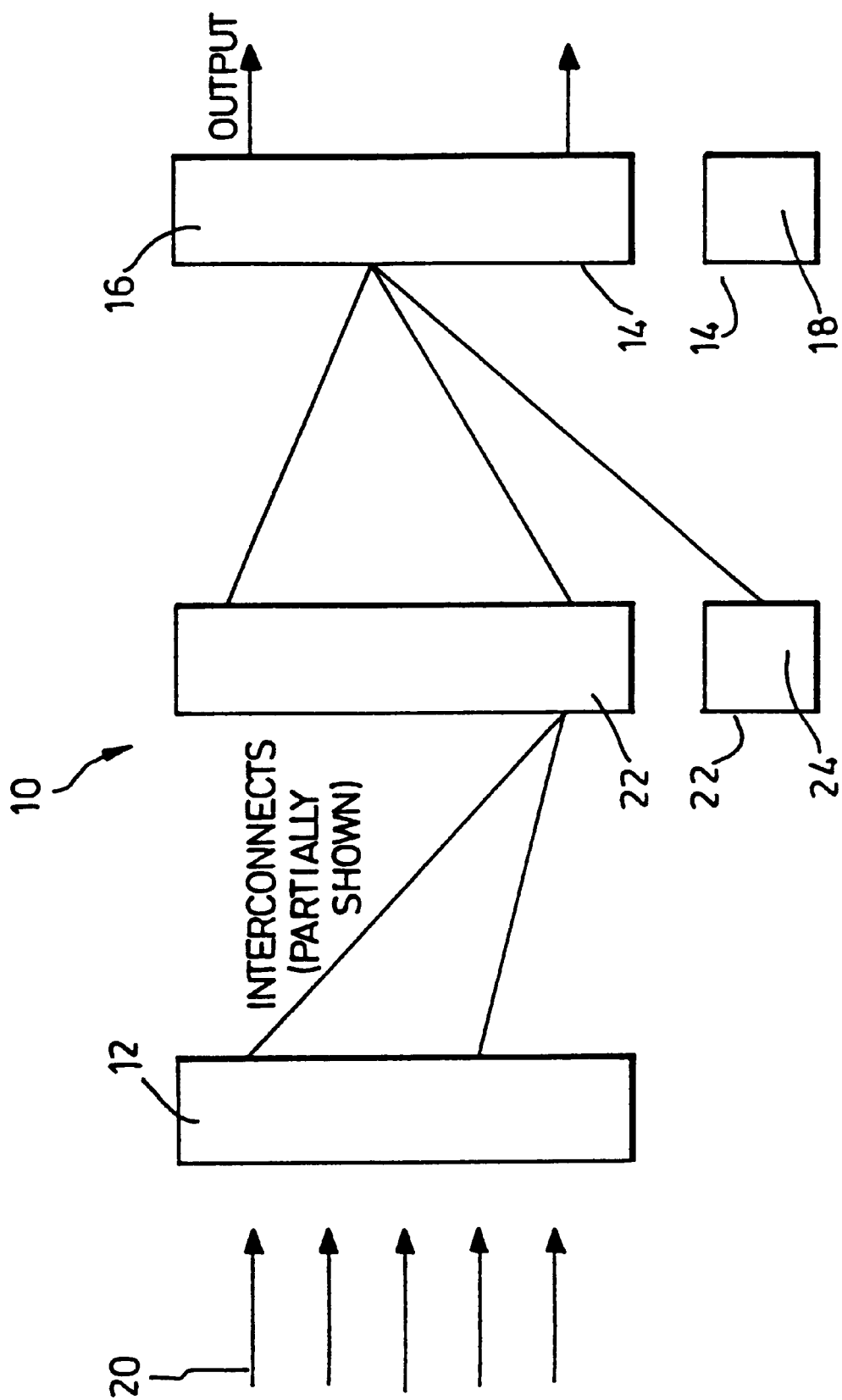
FIG. 1 is a schematic diagram of a neural network.

FIG. 1 shows the architecture of a pattern identifying neural network 10 of the present invention which comprises at least an input layer 12 and an output layer 14, the output layer having a plurality of principal nodes 16, each principal node trained to recognise a different class of pattern, and at least one fuzzy node 18 trained to recognise all classes of pattern recognised by the principal nodes, but with activation thresholds set at levels higher than the corresponding threshold levels in the principal nodes 16. Such a network can determine whether an input 20 belongs to a known class of pattern or whether classification as an unknown class is a more appropriate assignment. Typically there is at least one further, hidden layer 22 of nodes, and typically, but not necessarily, a feedforward architecture is employed, in which instance the number of nodes in the hidden layer 22 will be equal to the number of nodes in the input layer plus a bias node 24. Other architectures, such as a Parzen network or a radial basis function network, may be utilised in this position.

The principal nodes 16 in the output layer 14 can be regarded as 'sharp' nodes, since supervised training of these nodes using very high but carefully adjusted cut-off thresholds results in a principal node firing when the input pattern is of the class of pattern specific to that node. The problem of identifying an input pattern as 'unknown' is addressed by the provision of fuzzy nodes 18 (which represent the unknown category), adjustment of thresholds in the output layer 14 and fuzzification of same. More specifically, a fuzzy node 18 is trained to respond to every training pattern used in training the principal nodes 16, but with thresholds set ca. 10–20% higher than in the corresponding 'sharp' principal node. Thus the fuzzy node is trained to be a kind of 'dustbin' which responds to every input pattern which cannot itself be classified with certainty by any of the 'sharp' nodes.

More specifically still, for a feedforward neural network the well known error back propagation algorithm or an adaption thereof is suitable for use in the supervised training phase described above. In this instance there is no limit on the number of layers and nodes, or on the activation functions used. This allows exploitation of the internal capacities of the basic algorithms, in particular the good internal feature extraction and selection abilities displayed by such algorithms. It will be appreciated, however, that other training methods are within the scope of the invention. The 'sharp' principal nodes are trained using the classic error backpropagation algorithm, wherein a series of exemplar patterns are measured and database files are created for each class of pattern to be distinguished. These patterns are presented to the input layer 12 and the system iterated to minimise the output errors of the network. The outputs of the principal nodes 16 are interpreted as representing the grades of membership of the input pattern into the particular output classes that the principal nodes have been trained to recognise. Such grades of membership resemble a fuzzy membership grade function with an output in the <0,1> range.

The or each fuzzy node has a membership grade set at a relatively high level for every training pattern used; for a given training pattern the grade may be 10–15% less than the membership grade set with the node that principally responds to that training pattern. Therefore, the fuzzy or each node responds to every input training pattern slightly more weakly than the corresponding dedicated principal node; however, a new input pattern which does not belong to any of the training categories usually causes the fuzzy node(s) to respond most strongly.

It is possible, and indeed commensurate, with the normal fuzzy numbers approach to distribute the answer from the output layer for a given input pattern across a series of output nodes representing different classes of pattern. Therefore it is possible, for example, to produce the following responses from a network with four principal nodes O(i) in the output layer: O(1)=0.1, O(2)=0.5, O(3)=0.25 and O(4)=0.15. Again in keeping with a fuzzy numbers approach, it is not necessary to be in full agreement with probability theory (ie $\Sigma O(i)$ does not have to equal unity), although such agreement may provide insight into the formulation and understanding of the output of the network.

In order to resolve uncertainty in difficult classification cases, a 'proximity measure' may be introduced which is based on an assessment of the firing intensity of the 'sharp' principal and fuzzy nodes in the output layer. The proximity measure, which is involved when the fuzzy 'unknown' node responds most strongly, renders the recognition process even more flexible. In the case of such a response it may be desirable to know which of the 'sharp' classes of pattern is closest to the input pattern. Selection of this 'most adequate' training category is based on comparison of the corresponding principal node responses with the 'unknown' fuzzy node output. Providing the difference between the response of the fuzzy node and the response of at least one of the principal nodes does not exceed a predefined, user selectable 'proximity range' the system searches for all nodal outputs falling with the proximity range. The result clearly resembles the fuzzy classifier response described above before 'sharpening', the node having the nearest response to the output of the fuzzy node being interpreted as representing the nearest 'sharp' category. The proximity measure is especially useful when two output nodes and the unknown, fuzzy node are responding together.

Furthermore, the probability distribution representing the likelihood of an input pattern falling into any of the classes of pattern represented by the principal nodes may be calculated. Such a distribution may be said to describe event ambiguity, i.e. the degree to which an event occurs.

Figure 2:
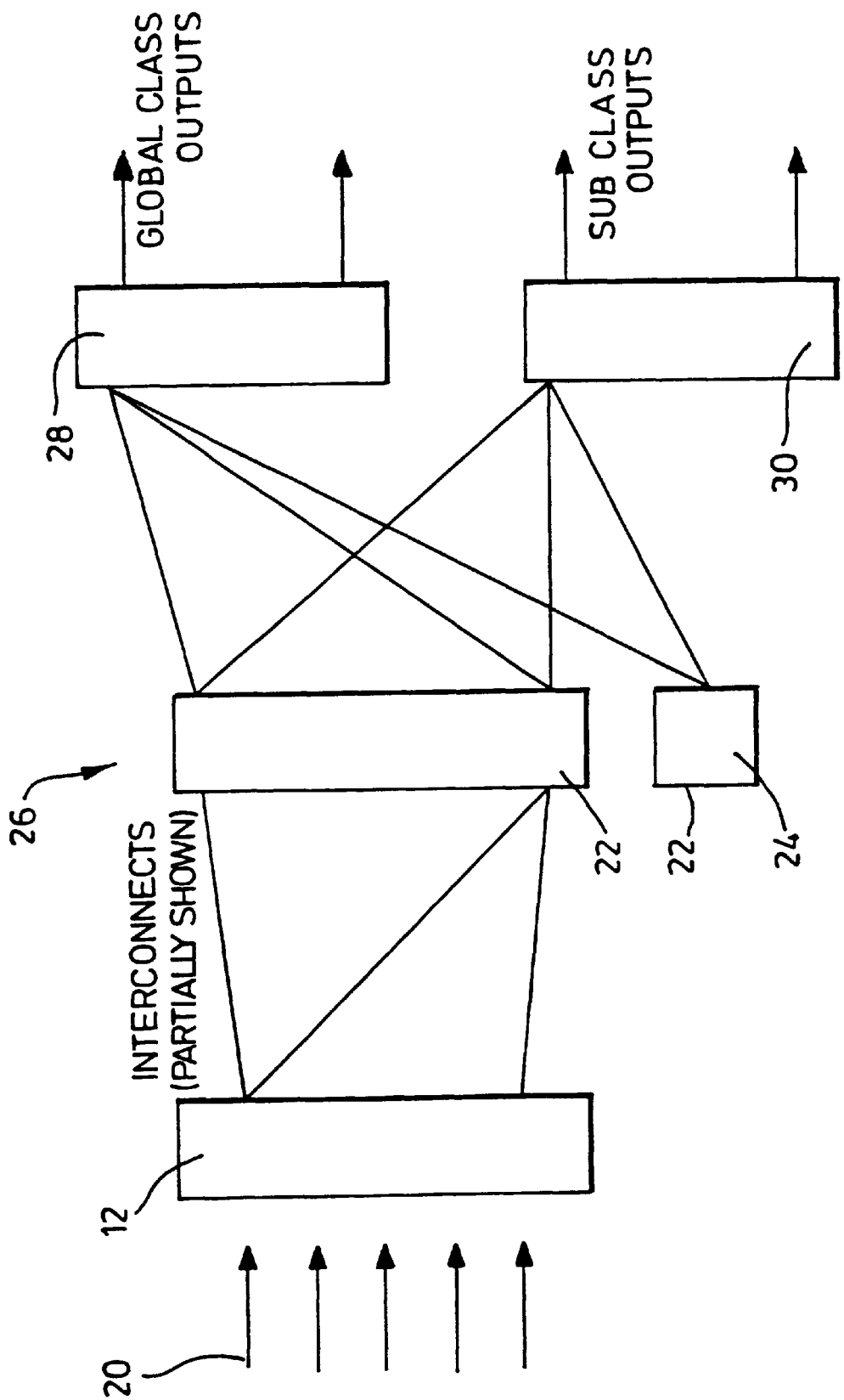
FIG. 2 is a schematic diagram of a neural network able to identify sub-classes of patterns.

FIG. 2 depicts a neural network which, in addition to having the capability to classify input patterns as 'unknown', can classify input patterns in terms of global classes and sub-classes thereof. The network 26 consists of an input layer 12 which receives an input pattern 20, a hidden layer 22 having a number of nodes equal to the number of nodes in the input layer together with a bias node 24. A feedforward architecture is employed, although, again; other architectures may be used. The ability of the network 26 to categorise patterns into global classes and sub-classes lies in the division of the output layer into two 'slabs' 28, 30. One slab 28 is coded for global classes, the second slab 30 for local sub-classes. In both instances there is one output node for every class of pattern to be discriminated together with a fuzzy node (not shown). Training is performed substantially as described above, with training patterns that represent a single sub-class category only, i.e. different classes are not mixed within a training pattern.

The input pattern 20, inputted into the neural network 26 for pattern recognition, consists of a series of input variables. One application of particular importance is in the detection of odours, in which instance the input variables are the outputs of a plurality of gas sensors, or quantities related thereto, and the pattern represented by these outputs can be regarded as a characteristic 'signature' of the detected odour.

A class of gas sensors of particular interest to the assignees are gas sensors based upon semiconducting organic polymers. In this instance the pattern inputted to the neural network is usually the fractional change in resistance of a gas sensor measured on exposure of the sensor to a gas sample, normalised with respect to the sum of the fractional resistance changes across the entire array of gas sensors. In other words, the normalised input corresponding to the ith gas sensor in an array of n sensors is given by equation 2:

$$\frac{\Delta R_i / R_i}{\sum_{i=i}^{n} abs(\Delta R_i / R_i)} \times 100 \quad (2)$$

where $R_i$ is the base resistance of the ith gas sensor and $\Delta R_i$ is the change in resistance of the ith sensor. The term "abs" denotes the absolute, or modulus, value of $(\Delta Ri/Ri)$, i.e., if $(\Delta Ri/Ri)$ is $-x$, then abs $(\Delta Ri/Ri)$ is $x$.

Patterns from arrays of sensors of this type are prone to instability due to variations in ambient temperature and humidity. One method of correcting for the effects of temperature and humdity, using a neural network of the present invention, is to connect one input node to a humidity sensor measuring the humidity of the sample and to connect another input node to a temperature sensor measuring the temperature of the sample. Training of the network involves the use of training patterns corresponding to different temperatures and humidities.

Pattern recognition may be improved by performing some other form of pattern classification prior to use of the neural network and inputting the results of said other form of pattern classification, together with the original pattern, to the neural network. For example we have found that with arrays of semiconducting organic polymers it is often desirable for presentational purposes to map, or reduce, the multidimensional pattern data into two or three dimensions. The well known principal component analysis (PCA) technique has proved very useful in this regard. The PCA technique is a linear orthogonal transformation from multi-dimensional input space to a two or three dimensional space such that the coordinates of data in the two or three dimensional space are uncorrelated and the maximal amount of variance from the original data is preserved by a small number of coordinates. By providing an extra two or three input nodes in the neural network and inputting into these extra nodes the coordinates of a pattern projected into two or three dimensions it is possible to achieve substantially reduced training times and produce more robust networks, especially where evaluation of unknown classes is concerned. It will be appreciated that other linear, or indeed non-linear, transformations are also applicable, and that the approach has far wider application than merely to patterns obtained from arrays of gas sensors.

An important variable in the field of gas or odour sensing is the concentration of the gas or volatile compound detected. In fact, the dual output slab network configuration described above has application to concentration prediction for a single chemical species. For this purpose the training dataset consists of patterns representing different concentrations of volatile compound. The output of one slab is set to map concentration in a graded manner, whilst the outputs of the second slab is set to map the identity of the volatile compound.

The input pattern 20 to the network 26 may be preprocessed prior to pattern identification. This feature extraction process may be performed in two ways:

1. By removing input variables which do not contribute substantially to the final identification—the outputs of certain gas sensors in the aforementioned application. Therefore the number of training patterns remains unchanged, but the size thereof is reduced.
2. By decimating the input database without reducing the dimensions of the individual input data vectors. The number of training patterns becomes smaller, but the size thereof remains constant.

Although the first preprocessing approach is a valid one, an implementation of the second approach has been found which provides a convenient means of preprocessing gas sensor data. The decimation of the input data vectors is achieved in a series of steps:

a) input database file (a training pattern) is processed individually, and is initially converted into a vector (optionally normalised);
b) the probability density function is computed for each vector with user declared resolution, usually involving the separation of the vector into five equidistant bands;
c) for each band, four examples are selected randomly from the processed input vector.
d) the algorithm attempts to select patterns up to a user defined maximum number. In a preferred embodiment this maximum number of patterns is twenty, and, the algorithm attempts to select four examples for each band in the probability distribution function; this may not be possible, in which case the number of selected patterns is less than twenty.

What is claimed is:

1. A pattern identifying neural network comprising at least an input and an output layer, the output layer having a plurality of principal nodes, each principal node trained to recognize a different class of patterns, and at least one fuzzy node trained to recognize all classes of patterns recognized by the principal nodes but with outputs set out at levels lower than the corresponding outputs of the principal nodes.

2. A neural network according to claim 1 which further comprises at least one hidden layer of nodes.

3. A neural network according to claim 2 in which a feedforward architecture is employed.

4. A neural network according to claim 3 in which the number of nodes in each hidden layer is equal to the number of nodes in the input layer plus a biasing node.

5. A neural network according to claim 3 or claim 4 in which the error back propagation algorithm is used to train the network.

6. A neural network according to claim 1 in which a fuzzy pattern classification system is employed.

7. A neural network according to claim 6 in which, providing the output from the fuzzy node is the largest nodal output in the output layer and does not exceed the output of at least one principal node by a predefined value, the principal node having the next greatest output is selected as representing the most likely class of patterns.

8. A neural network according to claim 7 in which the probability distribution representing the likelihood of an input pattern falling into any of the classes of patterns represented by each of the principal output nodes is calculated.

9. A neural network according to claim 1, in which the output layer comprises two slabs, each slab comprising a plurality of principal nodes and a fuzzy node, the principal nodes of one slab being trained to recognize global classes of patterns and the principal nodes of the other slab being trained to recognize sub-classes of patterns.

10. A neural network according to claim 9 in which the input pattern input to the input layer comprises the outputs of a plurality of gas sensors or quantities related thereto.

11. A neural network according to claim 10 in which the principal nodes of the second slab are trained to recognize patterns representing different concentrations of a least one gas or volatile species.

12. A neural network according to claim 10 in which the output of a temperature sensor is input to the input layer.

13. A neural network according to claim 10 in which the output of a humidity sensor is input to the input layer.

14. A neural network according to claim 1 in which the input pattern is reduced by a linear or non-linear mapping technique and the results therefrom, together with the unreduced pattern, are input to the input layer.

15. A neural network according to claim 14 in which the mapping technique is principal components analysis.

16. A neural network according to claim 1 in which the input pattern is preprocessed prior to pattern identification.

17. A neural network according to claim 16 in which the preprocessing comprises removal of elements of the input pattern which do not contribute substantially to the final identification.

18. A neural network according to claim 16 in which the preprocessing comprises decimation of the input database.

* * * * *